April 1, 1947. M. L. TAYLOR 2,418,205
APPARATUS FOR PREVENTING THE ACCUMULATION OF ICE
Filed Nov. 1, 1941 2 Sheets-Sheet 2
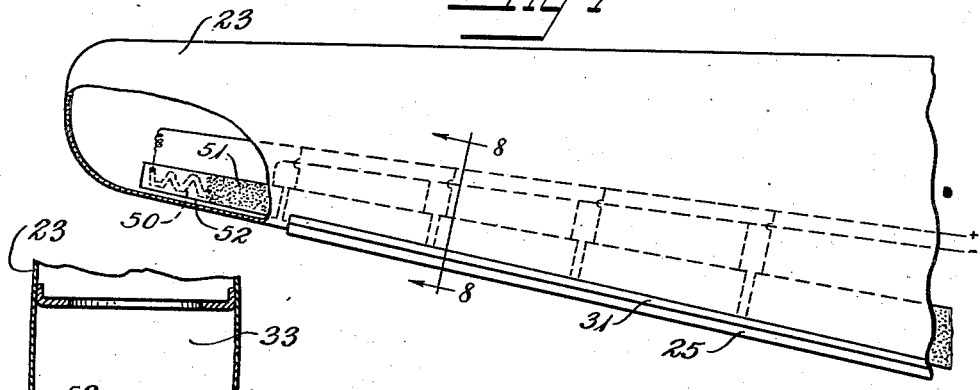
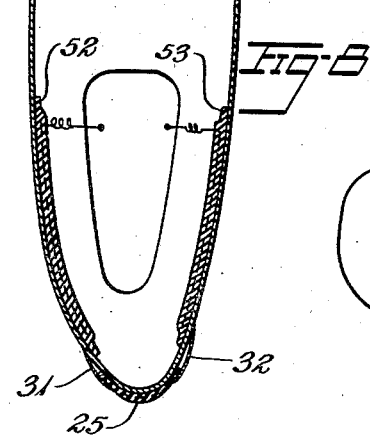
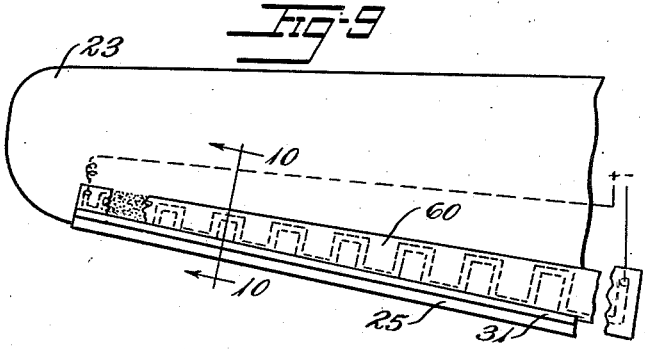
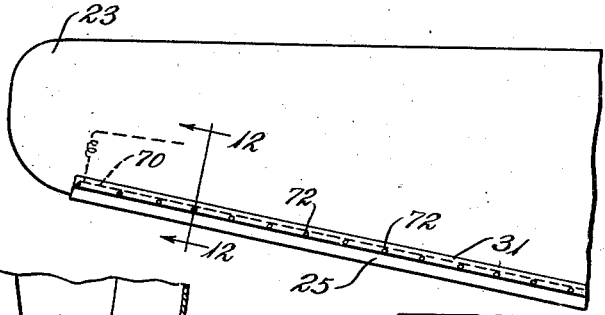
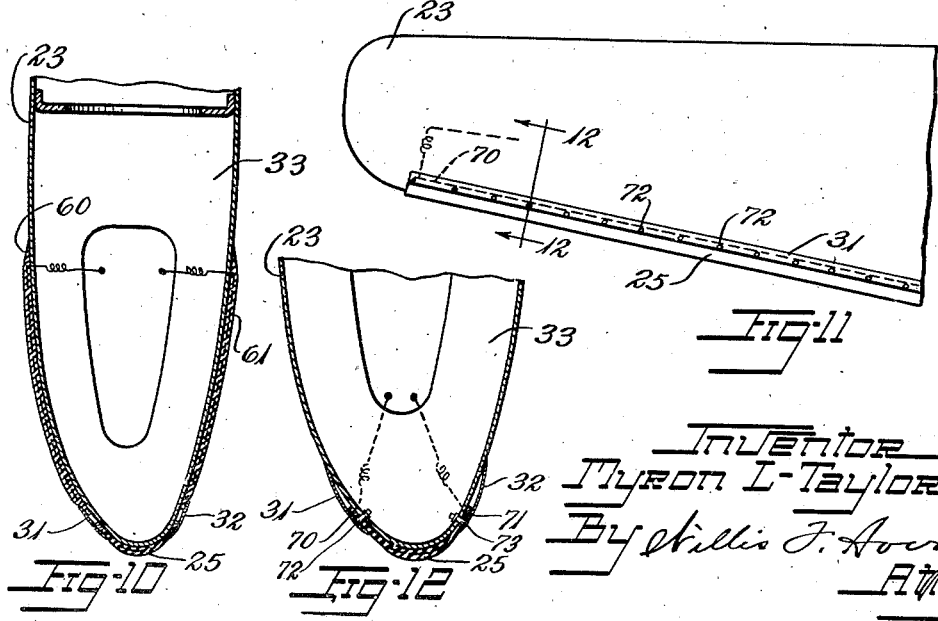
Inventor
Myron L. Taylor
By Willis T. Avery
Atty.

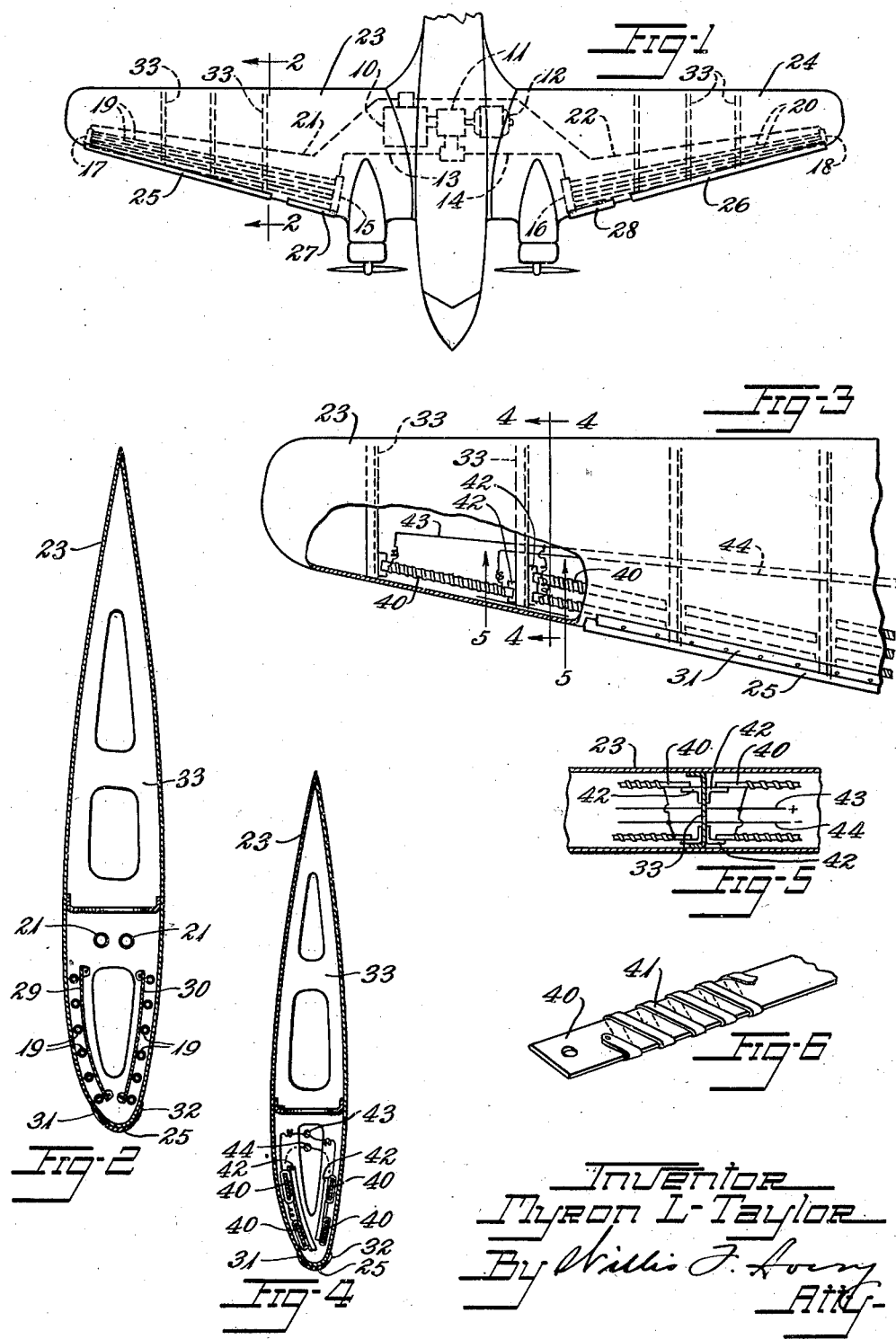

Patented Apr. 1, 1947

2,418,205

UNITED STATES PATENT OFFICE 2,418,205

APPARATUS FOR PREVENTING THE ACCUMULATION OF ICE

Myron L. Taylor, West Englewood, N. J., assignor to The B. F. Goodrich Company, New York, N. Y., a corporation of New York Application November 1, 1941, Serial No. 417,500

2 Claims. (Cl. 244—134)

This invention relates to preventing the accumulation of ice by breaking up ice formations, or by preventing the formation of ice, or both. The invention is useful especially for preventing accumulation of ice upon wings, control surfaces, struts, or other airfoils or parts of aircraft, although the invention is applicable for use with other structures as well, where icing is a problem.

For the purpose of illustration the invention is hereinafter shown and described with reference to the wing of an airplane, although it will be understood that the invention in some of its phases is applicable also to other parts of the aircraft and other structures.

The apparatus disclosed in Geer Patent No. 1,998,809, has been extensively used on aircraft, wherein an inflatable member, mounted at the leading edge of the airfoil has been expanded pneumatically to distort exposed surfaces and break up ice accumulations thereon. While such apparatus has been highly effective immediately at the leading edge of the wing, ice sometimes has formed back of such position and while it has been proposed to extend the distortable area, including elastic area, back over the comparatively flat surface of the wing, this expedient has not been fully satisfactory because of the high force of suction in such region which has tended to lift the distortable surface from the wing surface, resulting in objectionable disturbance to the air flow and to the performance of the aircraft, and necessitating expedients such as increasing the tension under which the working parts are installed and the provision of high operating air pressures.

Proposals made heretofore to meet the icing problem by supplying heat to the airfoil to melt the ice have not been wholly satisfactory because of the difficulty in supplying an adequate amount of heat to the full area requiring protection, especially with one or more engines inoperative where such engines supply the heat. Also, the melting expedient has not been effective at the leading edge in cases where the ice has formed in a local condition so as to form a natural lock over the leading edge held in place by the air stream although melted free of the surface. Again, the reduction of the ice to water by heating at the leading edge has resulted in the flowing of such water back over the airfoil and a refreezing thereof beyond the heated portion. And the presence of water has hindered the ready removal of ice particles otherwise free.

The chief objects of this invention are to provide apparatus overcoming the foregoing and other defects of both the inflation system and the heated system; to provide apparatus in which the advantages of both the inflation system and the heating system are availed of while the disadvantages are eliminated or reduced; to provide for effective ice elimination not only at the leading edge of an airfoil but also over an extensive area rearwardly of such leading edge; to provide for economy of heating and mechanical power in the operation of the apparatus; and to provide for structural strength and serviceability, together with light weight, and to provide for convenience of manufacture and economy of materials.

These and further objects will be apparent from the following description, reference being had to the accompanying drawings in which:

Fig. 1 is a plan view, with parts broken away, of an airplane of the monoplane type in which apparatus constructed according to and embodying the invention is incorporated in the wings.

Fig. 2 is a section taken along the line 2—2 of Fig. 1.

Fig. 3 is a view on an enlarged scale of the starboard wing but showing a modified construction.

Fig. 4 is a section taken along the line 4—4 of Fig. 3.

Fig. 5 is a section taken along the line 5—5 of Fig. 3.

Fig. 6 is a perspective view of an electrical heating element used in the embodiment of Fig. 3.

Fig. 7 is a view like Fig. 3 but showing a further modified construction.

Fig. 8 is a section taken along the line 8—8 of Fig. 7.

Figs. 9 and 11 are views like Fig. 3, but showing further modified constructions.

Figs. 10 and 12 are sections taken along the lines 10—10 and 12—12 of Figs. 9 and 11, respectively.

In accordance with the invention I utilize advantageous characteristics of the expedient of heating together with the advantages of the surface-distorting expedient for ice prevention, the two being used in combination so as to make available such combined advantages and to eliminate or reduce to a large extent the disadvantages of each.

With reference to the illustrative application of the invention to the leading edge of a wing or other airfoil, I provide an inflatable structure at the leading edge of the wing without carrying such structure rearwardly to any great extent.

In the area immediately rearward of such structure, and in association therewith I provide means for heating such area. Thus, by utilizing the distortable structure at the leading edge without the use of heat in that region, the natural lock of ice formations upon such leading edge can be broken without any melting and without resulting water. Beyond the relatively sharp curvature back of the leading edge, the airflow is more nearly parallel with the surface of the wing. The application of heat in this region has greater feasibility since less heat dissipation is encountered as a result of the more favorable conditions of airflow and since the air forces tend to remove the ice immediately as adhesion to the wing surface is destroyed. In this region only a relatively small amount of melting needs to take place to break the adhesion, the remaining work of ice removal being effected by the airflow, and only a relatively small amount of heat need be made available.

By way of example, with reference to wing sections of the general profile illustrated in the drawings, the invention makes possible good results with a coverage by the inflatable covering, including its stretchable area, of only about 2% to 4% of the chord of the wing, applying only to the portion of sharpest curvature, in contrast to the greater extent of coverage of about 10% to 15% which has been employed with inflatable coverings heretofore. The rearward extent of the heating units need not exceed about 20%—25% of the chord, and while it is preferred that the heating units be in close proximity to the wing skin in this area, so that the initial application of heat is thus localized, it is preferred for most applications not to confine the distribution of the heat to this area but to permit the heat to spread to other portions of the wing where it may be beneficial, which is possible by the invention without requiring the very large quantities of heat demanded by the prior systems purporting to accomplish all the ice-removal by heat alone.

With reference to the illustrative embodiments shown in the drawings, and first with respect to the embodiment of Figs. 1 and 2, the surface distorting means may be combined with heating means in the form of a heat-exchange apparatus having pipes or other conduits for circulating the heating fluid. For the heating fluid water, steam, air or other suitable medium may be used, and heat may be obtained from the exhaust gases of the internal combustion engines or other power source, or from an independent heater provided for the purpose, or both.

As shown diagrammatically in Fig. 1 the heat exchange apparatus may comprise a heater 10, a circulating pump unit 11 driven by a motor 12, and feeder lines 13, 14 connecting the heater to heating units in the wings comprising headers 15—16, and 17—18, connected by pipes 19 and 20. Return pipes 21—22 return the fluid to the heater 10.

Immediately at the portions of sharpest curvature of the leading edges of wings 23—24 of the aircraft are mounted inflatable shoes 25—26 and 27—28, which shoes may be of any suitable construction, for example as disclosed in Geer Patent #1,998,809, for the purpose of breaking up and dislodging ice at such leading edge of the wing.

In accordance with the invention the inflatable shoes need not extend a great distance rearwardly of the leading edge of the upper and lower surfaces of the wing, owing to the fact that the heating units are located at the rear margins of the shoe where the curvature of the wing lessens and the arrangement is such that the heating units are effective to loosen ice just rearwardly of the region taken care of by the inflatable element, so that in effect the region of ice removal of the combined action of the inflatable shoe and the heating units extends back along the surface of the wing to cover the area normally subject to icing. Inasmuch as the inflatable shoes are installed only on the small area of sharp curvature at the leading edge very little tension will be required to keep them flat and snug against the surface, thus they may be considerably reduced in thickness and weight, and at the same time require less air pressure for operation.

The heating units preferably are located in close proximity to the inner side of the skin of the wing 23 through which the heat is readily transmitted, as in the case of metal wings, and baffles 29 and 30, which may comprise insulating material, may be employed if desired so that the heat will be initially applied principally to the local area immediately rearward of the inflatable unit. However, the heat may be permitted to spread away from this area and to this end the baffles may be left open at the foremost and rearmost tubes, as shown. The areas of heat application preferably overlap the upper and lower margins of the inflatable shoe 25 and also may include at least a part of fairing strips 31, 32 applied externally over such margins of the shoe in order to provide smooth aerodynamic surfaces over such margins. The heating units thus overlap the parts of the inflatable shoe that are attached and therefore restricted in extensibility, so that the area of ice removal is continuous over the combined extent of the inflatable shoe and the heated areas. All the pipes are suitably supported in the structure of the wing, as by a disposition of the pipes within apertures in chordwise members 33 of the wing.

Inasmuch as the heat is applied locally the power requirements for supplying the heating energy are kept to a minimum. Because the heat is applied at portions of the wing of relatively small curvature where the flow of air is most effective to remove ice, only sufficient heat is required to melt a thin layer of ice next to the wing surface to loosen the same so that the ice will be carried rearwardly by the air flow which further contributes toward keeping power requirements for heat energy to a minimum. At the leading edge of the wing where curvature is greatest and the air flow is less effective to carry away ice the inflatable shoe operates most advantageously to break up ice deposited upon it and on occasions heavy caps of ice locked over it. Under extreme conditions, such as in the case of a heavy ice cap that has been allowed to lock over the leading edge and extend rearwardly beyond the rear margins of the shoe, the inflatable portion of the shoe is effective to break up the ice at the front, and the ice rearwardly thereof that still adheres to the wing can be loosened by the locally applied heat and permitted to be carried away by the air flow, once the ice cap is broken.

In the embodiment of Figs. 3 to 6, inclusive, the arrangement is like that of the first embodiment except that electrical heating units are provided in place of the fluid heating means. In the second embodiment parts similar to those of the first embodiment are designated by like numerals. The electrical heating units may comprise elements 40—40 of suitable dielectric and heat-resisting material upon which are wound resistance elements 41, 41. The electrical heating units may be divided into sections fitting between the chord elements 33 of the wing and may be mounted upon brackets 42—42 secured to the members 33. The number of heating units in each section may be suited to the local chord dimension of the wing, so that the percentage of chord dimension to which the heat is applied may be kept substantially the same throughout the span of the wing. Electrical conductors 43, 44 supply electrical energy from any suitable power source (not shown) to the heating units, which units may be connected in parallel to the power line, as shown. As in the case of the first embodiment the heat is applied locally over areas of the wing skin overlapping the rear margins of the inflatable shoe 25 to provide for continuity of the ice removal area throughout the combined extent of the inflatable shoe and the heating zone.

In the embodiment of Figs. 7 and 8 a metallic heating element 50 is embedded within a body of suitable composition 51 providing heating units 52 and 53 that may be mounted as by rivets or other suitable means in contact with the inner side of the skin of the wing 23, the construction and operation of the combined assembly being otherwise the same.

In the embodiment of Figs. 9 and 10, electrical heating units 60, 61 which may be like the heating units of Figs. 7 and 8, are provided, but the heating units 60, 61 are mounted at the outside of the skin of the wing 23 as shown. The fairing strips 31, 32 may be mounted to overlap the rear margins of the inflatable shoe 25 and the forward margins of the unit 60 to facilitate provision of an aerodynamic surface thereover, and by utilizing a heat-conducting material for the fairing strips the heat from the units 60, 61 is distributed over the rear portions of the shoe.

In the embodiment of Figs. 11 and 12 the inflatable shoe 25 includes strips 70, 71 of metal embedded within the rear margins of the shoe for reinforcement of its attaching margins. By making these strips of a material of suitable electrical resistance they may be utilized as electrical heating units to heat the region of rear margins of the inflatable shoe. The fairing strips 31, 32, which may be of metal, are secured along with the rear margins of the shoe to the skin of the wing 23 by means of fastening elements 72, 73 extending through the fairing strips, the shoe and the wing skin. In this embodiment the combined reinforcements and heating elements 70, 71 are effective to heat the rear margins of the shoe and the heat is distributed forwardly and rearwardly thereof by means of the fairing strips 31, 32 and also through the wing skin in that region and through the fastening elements 72, 73.

While for best operation under all icing conditions, it is preferred to utilize the advantages obtained by the combination of the inflatable shoe at the nose and the heating means just rearwardly thereof, as described herein, in some cases the heating means may be utilized alone advantageously. For example, as a result of applying the heat only to the area of the wing rearwardly of the zone of sharpest curvature, and not directly to such zone, objectionable melting at such zone and rearward flow of water are avoided, as hereinbefore discussed. This absence of water in the comparatively flat regions renders the heating means in such flat regions more fully effective to avoid the presence even of small particles of ice in such regions, either attached or floating, which would create objectionable surface roughness. This is of particular importance in view of the critical aerodynamic requirements with respect to the wing surface in this region. These advantages of the heating arrangement herein described as compared to prior heating expedients make it feasible to utilize the heating means whether or not ice is entirely removed at the zone of sharpest curvature, even though for best all around operation the combination of the inflatable means and the heating means, as described, is advantageous.

Variations may be made without departing from the scope of the invention as it is defined in the following claims.

I claim:

1. Apparatus for preventing the accumulation of ice upon a surface, said apparatus comprising, in combination, a distortable member for covering said surface comprising stretchable rubber-like material, means for distorting said member in a portion thereof, and means comprising a metallic element in association with said member adjacent said portion for heating a limited area of said surface immediately adjacent said portion, said metallic element of the heating means overlying the margin of said member.

2. Apparatus for preventing the accumulation of ice upon a surface, said apparatus comprising, in combination, a distortable member for covering said surface comprising stretchable rubber-like material, means for distorting said member in a portion thereof, and means comprising a metallic element in association with said member adjacent said portion for heating a limited area of said surface immediately adjacent said portion, said metallic element of the heating means being embedded in said member.

MYRON L. TAYLOR.

REFERENCES CITED

The following references are of record in the file of this patent:

UNITED STATES PATENTS

| Number | Name | Date |
|---|---|---|
| 2,214,919 | Burgess | Sept. 17, 1940 |
| 2,142,785 | Hanson | Jan. 3, 1939 |
| 1,998,809 | Geer | Apr. 23, 1935 |

FOREIGN PATENTS

| Number | Country | Date |
|---|---|---|
| 523,108 | British | July 5, 1940 |
| 523,880 | British | July 24, 1940 |
| 189,796 | British | Nov. 30, 1922 |